United States Patent [19]

Combs et al.

[11] Patent Number: 5,096,221
[45] Date of Patent: Mar. 17, 1992

[54] AIR BAG DOOR WITH PLURAL SUBSTRATES

[75] Inventors: Richard Combs, Farmington; Scott Rafferty, Dover, both of N.H.

[73] Assignee: Davidson Textron Inc., Dover, N.H.

[21] Appl. No.: 658,529

[22] Filed: Feb. 21, 1991

[51] Int. Cl.$^5$ .............................................. B60R 21/16
[52] U.S. Cl. ..................................... 280/732; 280/728
[58] Field of Search ............... 280/728, 730, 731, 732, 280/743; 180/90; 296/70

[56] References Cited

U.S. PATENT DOCUMENTS

| | | | |
|---|---|---|---|
| 4,810,005 | 3/1989 | Föhl | 280/732 |
| 4,893,833 | 1/1990 | DiSalvo et al. | 280/728 X |
| 4,925,209 | 5/1990 | Sakurai | 280/732 |
| 4,964,653 | 10/1990 | Parker | 280/732 |

Primary Examiner—Charles A. Marmor
Assistant Examiner—Tamara L. Finlay
Attorney, Agent, or Firm—Reising, Ethington, Barnard, Perry & Milton

[57] ABSTRACT

An interior trim product has an opening therein formed to overlie an air bag restraint assembly including a canister for generating gas for inflating an air bag for deployment into the passenger compartment of a motor vehicle. The opening is closed by a door having a vinyl outer covering matching the aesthetic appearance of the outer surface of the interior trim product and including a soft foam backing formed by reaction injection molding foam between the vinyl skin and a first substrate having construction holes therein; a second substrate is connected to the first substrate to cover the holes and to reinforce the door to prevent foam and vinyl damage during air bag deployment and wherein the second substrate is adapted to define a hinged connection between the door and a releasable connection at the opposite end of the door for holding it in place within the opening against separation therefrom until an air bag is inflated and deployed into the passenger compartment.

4 Claims, 1 Drawing Sheet

AIR BAG DOOR WITH PLURAL SUBSTRATES

FIELD OF THE INVENTION

This invention relates to air bag restraint systems for use in motor vehicles and more particularly to such air bag restraint systems which are housed within an interior trim product of the vehicle behind or below an opening which is closed by a door that opens to allow deployment of an air bag as it is inflated following vehicle impact

BACKGROUND OF THE INVENTION

Air bag deployment has created many problems including providing a closed opening which is covered by either a door or a weakened section in the housing for the air bag which will separate from the housing to provide a path for deployment of an air bag into the passenger compartment as it is inflated.

Some of the prior art pads or covers for air bag devices are not soft and do not match or conform to the styling and aesthetic requirements of an associated interior trim product in which the air bag restraint system is housed. Such covers are often formed from injection molded thermoplastic elastomers or thermoplastic olefin which are suitable for midmount locations such as on the front vertical surface of an instrument panel which locations are not subject to radiant heating by sunlight directed through a front windshield of a vehicle. Such covers do not always perform satisfactorily if exposed to direct radiant heating, e.g., when located on the upper surface of an instrument panel or dashboard.

Other prior art pads or covers include a foamed interior which provides a soft feel and an outer skin which can be aesthetically matched to the material of the outer surface of an interior product which houses the air bag restraint system.

Examples of such prior art doors are shown in U.S. Pat. No. 3,708,179 which discloses mid-mounted doors formed of a layer of urethane foam and an outer cover of a plastisol skin material. The '179 structure is supported on a pair of spaced hinge pins for movement outwardly of the front vertical face of an instrument panel so as to permit deployment of an air bag into the passenger compartment at the passenger side of the front seat.

U.S. Pat. Nos. 4,946,653 and 4,893,833 disclose door configurations for closing a upper mount configuration wherein the door is inserted within an upper surface of an instrument panel and moved upwardly toward the windshield of the vehicle when the air bag is deployed.

In the construction of doors with soft foam inserts or substrates, a preformed outer skin or shell member formed by casting vinyl particles on a heated mold surface is placed in a female cavity of a foam mold of the type shown in U.S. Pat. Nos. 4,734,720 and 4,743,188 which are commonly assigned to the assignee of the present application, and which are incorporated herein by reference. A first substrate member is supported at construction holes therein on the lid of the mold which closes to form a mold space between the substrate and the preload vinyl skin. The substrate on the lid can also include a port through which foam precursors are directed into the mold space for reaction therein to form a cellular foam material that is soft to the feel. The resultant structure is removed from the foam mold and includes a vinyl skin which can be colored and grained to match the aesthetic appearance of the outer vinyl surface of an interior trim product such as an instrument panel having a upper opening therein for the deployment of an air bag.

Such doors have included a single substrate with openings therein through which foam escapes during the foaming process. In the past it has been necessary to clean the part to remove escaped foam and cover the foam openings so that the door is suitable for shipping and for use at final assembly. At final assembly, the door is connected either to the reinforcing insert in an interior trim product or to the canister of an air bag restraint system as determined by the ultimate original equipment manufacturer of such door and interior trim products.

Another problem with such doors has arisen since its substrate must meet several requirements including support of the product during the mold process and support of the door for hold-down and hinged connection to an associated part such as a canister housing or a reinforcing insert within the interior trim product.

The use of a door substrate for such purpose can impose higher stresses in the foam and vinyl of the door during air bag deployment leading to fragmentation or tearing thereof so as to produce debris problems of the kind discussed in U.S. Pat. No. 4,964,653 which is commonly assigned to the same assignee of the present application.

SUMMARY OF THE INVENTION AND ADVANTAGES

The subject invention is directed toward a door assembly for an opening through which an inflatable restraint device such as an air bag is deployed following vehicle impact. The door includes an outer skin and a foam interior so that it will conform to the styling feel and aesthetic appearance of an associated interior trim product which houses the air bag restraint system. The foam is connected to a construction substrate which has construction holes therein for use in holding the substrate in a spaced relationship with the skin component during a foam molding step. In accordance with the present invention, the construction substrate has the construction holes therein covered by a second substrate member which will eliminate the need to clean foam from the outer surface of the first substrate member and which will reinforce the first substrate member to prevent fragmentation of the vinyl and foam components during air bag deployment. Further, the second substrate member is configured to form both a hinged connection and a hold down connection which are adapted for connection to either the reinforcing insert of an interior trim product or a canister housing of the air bag restraint system such that the foam and vinyl components of the door assembly perform substantially only appearance and feel functions rather than structural functions when assembled in the opening for deployment of an air bag assembly.

The second substrate member has a hidden tear seam operable to release the door on air bag deployment without requiring mechanical interlocks between the door and interior trim product that will interfere with its operation o assembly.

An object of the invention is to provide a door closure for an air bag restraint system which is easy to manufacture and that will reduce foam and vinyl stress and debris formation during air bag deployment and that will enable standard substrate configurations to be used in the foam molding manufacture and that will provide a separately designed second substrate member for performing hinge, hold-down and tear seam functions when the door closure is assembled to an associated interior trim product for closing an air bag deployment opening therein.

A further object of the present invention is to provide a door assembly for closing an opening in an interior trim component of a vehicle in which an inflatable air bag assembly is housed for deployment of an inflated air bag into the passenger compartment of the vehicle upon vehicle impact, the interior trim component having an outer covering of cast vinyl material around the opening having styling grains and colors for providing an aesthetic appearance and including a backing of soft foam material; and in which opening is a door or closure panel having an outer cover of cast vinyl material with styling grains and colors corresponding to the outer covering of the interior trim component; the closure panel having a shape corresponding to the opening in the interior trim component and being fit into said opening for closing the opening and for preventing access to the inflatable air bag assembly; the closure panel having a first substrate member with a foam layer molded therebetween and means forming construction holes in the first substrate member exposing the foam layer; a second substrate member has a first segment thereon located in juxtaposed relationship with the first substrate at the holes for covering the construction holes and fasteners; said second substrate member has a first curved end for defining a hinged connection between the closure panel and the interior trim product when the closure panel is fit into the opening; the second substrate member has a second curved end for holding the closure panel in place within the opening and including a hidden tear seam for separating the closure panel from the interior trim product when the air bag is inflated for deployment through the opening into the passenger compartment of a vehicle.

Still another object of the present invention is to provide a door assembly for closing an opening having a front end and a rear end and sides formed in an interior trim component of a vehicle in which an inflatable air bag assembly is housed for deployment of an inflated air bag into the passenger compartment on vehicle impact, the interior trim component having an outer vinyl covering providing an aesthetic appearance; a closure panel having an outer cover of vinyl with an appearance corresponding to the outer covering of the interior trim component; the closure panel having a shape corresponding to the opening in the interior trim component and being fit into the opening for closing the opening and for preventing access to the inflatable air bag assembly; the closure panel having a first substrate member with a foam layer molded therebetween and having construction holes in said first substrate exposing the foam layer to the exterior of the closure panel; a second substrate member has a first segment thereon covering the construction holes and fasteners securing the second substrate member to the first substrate member for locating the second substrate member to reinforce the closure panel against damage to the foam layer and the vinyl cover during deployment of the air bag; the second substrate member has a first end defining a hinged connection between the closure panel and the interior trim product when the closure panel is fit into the opening; the second substrate member has a second end for holding the closure panel in place within the opening; and a hidden tear seam in the second end portion is separable to release the closure panel from the interior trim product when the air bag is inflated for deployment through the opening into the passenger compartment of a vehicle.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMODIMENTS OF THE INVENTION

Figure 1:
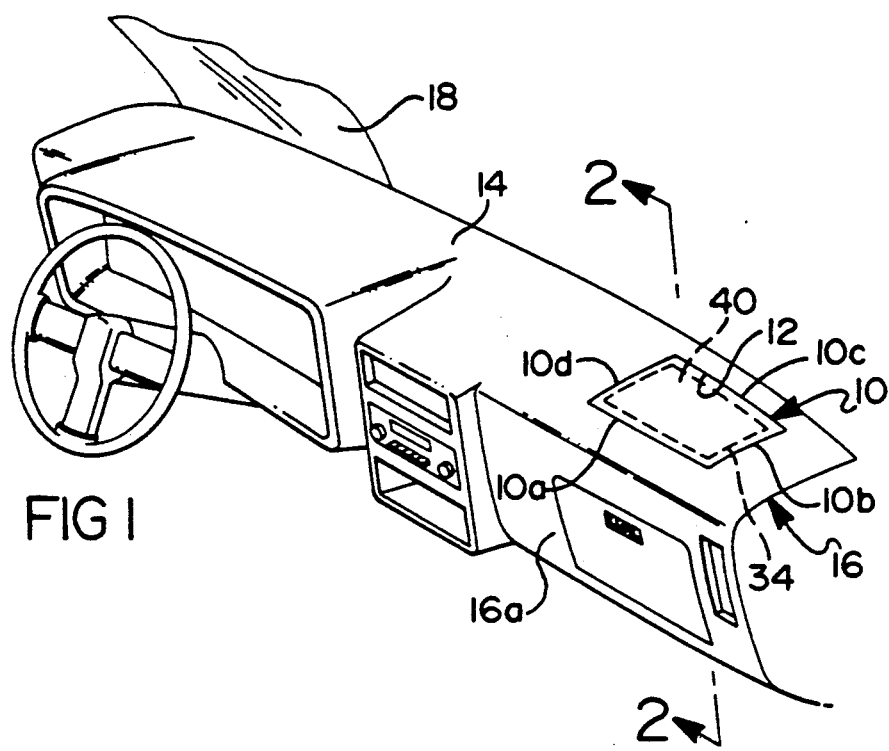
FIG. 1 is a perspective view of an instrument panel or dashboard which is one suitable interior trim product for housing and providing an opening for deployment of an inflatable restraint into the passenger compartment of a motor vehicle.

Referring now to FIG. 1, a door assembly for an opening through which an inflatable restraint safety device is deployed into a passenger compartment is shown at 10. In this embodiment of the invention, the door assembly 10 is shown in a top mount position in which it is located within an opening 12 formed through the top surface 14 of a dashboard or instrument panel 16. The opening 12 has a front edge 12a located adjacent the front surface 16a of the instrument panel 16 and it includes a rear edge 12b located in underlying relationship to a sloped front windshield 18. While shown in the upper surface of the instrument panel, the opening 12 could also be formed in the front surface 16a in what is known as a mid-mount position. The top mount or mid-mount of the door assembly 10 depends upon the location of an underlying air bag restraint system 20. In the illustrated embodiment of FIG. 1, the air bag restraint system 20 includes a gas generator or canister 22 located in a canister housing or casing 24 mounted on a suitable vehicle component not shown. The gas generator 22 has a plurality of openings 22a through which a suitable inflatant gas flow when a sensor 26 is actuated upon vehicle impact to condition a controller 28 to initiate gas generation all as is well known to those skilled in the art. The inflatant is directed into the interior of an inflatable air bag 30 connected at one end 30a to the casing 24 and having convolutions 30b which expand as the air bag is inflated to impact against the underside of the door assembly 10 to cause it to pivot upwardly toward the windshield 18 to allow for deployment of the air bag 30 through the opening 12.

In accordance with the invention, the door assembly includes a vinyl outer cover 32 which can be formed from cast vinyl material by processes such as those set-forth in U.S. Pat. Nos. 4,664,864 and 4,784,911, which are commonly assigned to the same assignee as in the present application and incorporated herein by reference. Such outer covers 32 have colors and grain appearances that are accurately matched to the appearance of the surface of an associated interior trim product such as the illustrated instrument panel. The vinyl outer cover 32 has edge portions 32a thereon bent over the peripheral edge 34a of a first construction substrate 34 of the type which is mounted on a lid of a foam mold apparatus such as illustrated and described in U.S. Pat. No. 4,784,366 and 4,873,032, commonly assigned to the same assignee as the present invention. In accordance with the present invention, the substrate has construction holes 34b for receiving fill nozzles on standard mold apparatus lids and holes to locate the insert so as to form a sealed connection with respect to the outer cover 32 and to define a space 36 into which foam precursors are directed in a known manner. Reaction of the precursors forms a soft feel foam layer 38 behind the cover 32 while providing a finished appearance to match the styling and appearance of a foamed interior trim product. End and side surfaces 10a–10d of the door assembly 10 are shaped to conform to the shape of the opening 12 so that the door assembly 10 will closely fit in the opening 12. The door assembly 10 seats on suitable recessed support surfaces 14a in the top surface 14 of the instrument panel 16 so that the outer cover 32 will be flush with the top surface 14.

In accordance with one feature of the present invention the first substrate 34 is connected to a second substrate 40 by suitable fasteners such as rivets 41 so as to locate a mid-segment 40a of the second substrate in juxtaposed relationship with the underside of the construction substrate 34 so as to cover the construction holes 34b so that any foam build-up thereon is covered and does not require cleaning. Furthermore, a resultant sandwich construction of the juxtaposed substrates 34, 40 will reduce stress in the vinyl cover 32 and an intermediate foam layer 38 thereby to prevent foam separation or vinyl tears so as to prevent or minimize the production of debris during deployment of the air bag.

The mid-segment 40a covers the construction openings such that foam material will not escape from these points during air bag deployment.

Figure 2:
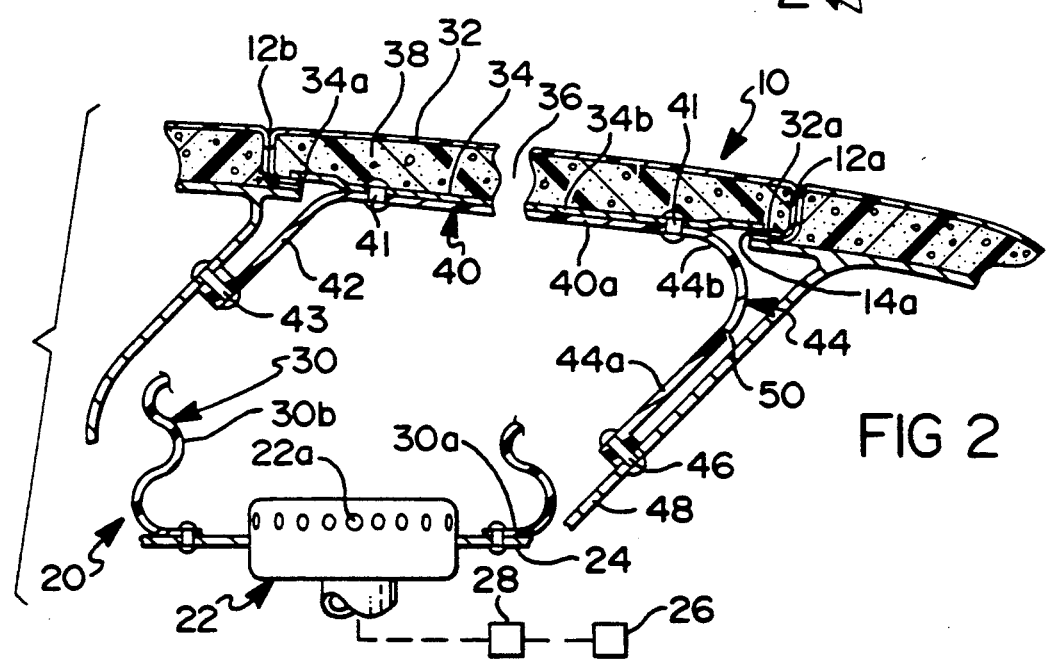
FIG. 2 is an enlarged sectional view of one embodiment of the invention taken along the line 2—2 of FIG. 1.

In the embodiment of FIG. 2, the substrate 40 has a curved end 42 which is connected by a fastener screw 43 to a support such as the canister or casing. The curved end defines a hinge point about which the door assembly 10 pivots upwardly toward the windshield when the air bag impacts against the mid-segment 40a of the substrate 40. The substrate has a second curved end 44 that defines a releasable hold down connection for securing the front end 10a of the door assembly 10 such that the inboard peripheral surface 32a of the outer cover 32 will be fully seated on the support surface 14a. More particularly, the second curved end 44 has a straight distal segment 44a that is connected by a fastener 46 to a canister wall 48. The second curved end 44 includes a hidden tear line or notch 50 therein at a point between a curved portion 44b and the straight distal segment 44a so as to be stressed for separation when the air bag impacts on the underside of the door assembly. This allows the front end 10a of the door assembly to freely release from the instrument panel so that the door assembly 10 will quickly open by pivotal movement about the hinge defined by the curved end 42.

Figure 3:
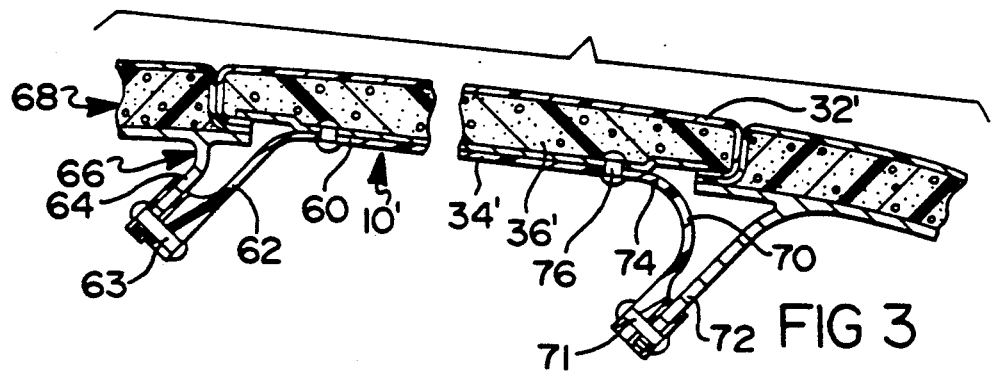
FIG. 3 is an enlarged sectional view like FIG. 2 but showing attachment of a door closure assembly to a reinforcing insert within an instrument panel.

In the embodiment of FIG. 3 like components to those found in the embodiment of FIG. 2 are designated with like reference numerals primed. A door assembly 10' is shown which has an outer cover 32', a construction substrate 34' and a foam layer 36'. In this embodiment a second substrate 60 is connected to the substrate 34' by rivets in the same manner as in the first embodiment of the invention.

The second substrate 60 has a curved end 62 which is connected by a fastener 63 to a flange 64 on a reinforcing insert or support 66 of an instrument panel 68. A second curved end 70 of the second substrate 60 is connected by a fastener 71 to a front flange 72 on the reinforcing insert 66. A hidden tear seam or notch 74 is formed in the curved end 70 at a curvature point closely proximate both a rivet connection point 76 between the two substrates and fastener 71 which holds the curved end 70 against the front flange 72. As in the first embodiment, the curved end 70 forms a door hold-down connection that will separate at tear seam 74 when the air bag is deployed so as to allow upward pivotal movement of the door assembly 10' about the hinge point defined by the curved end 62.

The door assembly of the subject invention thereby provides a soft skin door that is easily matched to adjacent interior trim products having foamed in place material and the door assembly can be formed by standard foam molding apparatus without requiring special modifications to either door mounted substrate components having construction holes therein or without requiring modification of the lid for carrying such substrates. The second substrate prevents debris during door opening movement and will reinforce the door to prevent damage to vinyl covering and foam layers therein. While the invention is shown in association with a dashboard or instrument panel it is equally suitable for use with other interior trim products such as driver side steering wheel housings. The arrangement is manufactured not only with standard equipment, practicing standard steps it enables the door to be used with less steps and in a more cost effective manner than the assemblies in the prior art.

The invention has been described in an illustrative manner, and it is to be understood that the terminology which has been used is intended to be in the nature of words of description rather that of limitation.

Obviously, many modifications and variations of the present invention in light of the above teachings may be made. It is, therefore, to be understood that within the scope of the appended claims, the invention may be practiced otherwise than as specifically described.

What is claimed is:

1. A door assembly for closing an opening in an interior trim component of a vehicle in which an inflatable air bag assembly is housed for deployment of an inflated air bag into a passenger compartment upon vehicle impact comprising:

said interior trim component having an outer covering around the opening having styling for providing an aesthetic appearance;

a closure panel having an outer cover with styling corresponding to the outer covering of said interior trim component; said closure panel having a shape corresponding to the opening in said interior trim component and being fit into said opening for closing the opening and for preventing access to said inflatable air bag assembly;

said closure panel having a first substrate with a foam layer molded between it and said outer cover and means forming construction holes in said first substrate exposing the foam layer to the exterior of said closure panel;

a second substrate having a first segment thereon located in juxtaposed relationship with said first substrate for covering said construction holes and means for securing said second substrate to said first substrate;

said interior trim component having a reinforcing insert for connecting said interior trim component to a vehicle frame component;

said second substrate having a first curved end connected to said reinforcing insert for defining a hinged connection between said closure panel and said interior trim product when said closure panel is fit into said opening; said second substrate having a second curved end connected to said reinforcing insert for holding said closure panel in place within said opening; and means forming a hidden tear seam in said second curved end portion for separating said closure panel from said interior trim component when said air bag is inflated for deployment through said opening into the passenger compartment of a vehicle.

2. A door assembly for closing an opening having a front end and a rear end and sides formed in an interior trim component of a vehicle in which an inflatable air bag assembly is housed for deployment of an inflated air bag into a passenger compartment upon vehicle impact comprising:

said interior trim component having an outer vinyl covering providing an aesthetic appearance;

a closure panel having an outer cover of vinyl with an appearance corresponding to the outer covering of said interior trim component; said closure panel having a shape corresponding to the opening in said interior trim component and being fit into said opening for closing the opening and for preventing access to said inflatable air bag assembly;

said closure panel having a first substrate with a foam layer molded between it and said outer cover and means forming construction holes in said first substrate exposing the foam layer to the exterior of said closure panel;

a second substrate having a first segment thereon covering said construction holes and means for securing said second substrate to said first substrate for locating said second substrate to reinforce said closure panel against damage to said foam layer and said vinyl cover during deployment of said air bag;

means defining a support;

said second substrate having a first end connected to said support for defining a hinged connection between said closure panel and said interior trim component when said closure panel is fit into said opening; said second substrate having a second end connected to said support for holding said closure panel in place within said opening; and means forming a weakened section in said second end portion separating to allow opening of said closure panel from said interior trim component when said air bag is inflated for deployment through said opening into the passenger compartment of a vehicle.

3. A door assembly for closing an opening having a front edge and a rear edge located adjacent a windshield and having sides in an interior trim component of a vehicle in which an inflatable air bag assembly is housed for deployment of an inflated air bag into a passenger compartment upon vehicle impact comprising:

said interior trim component having an outer covering of cast vinyl material around the opening having styling grains and colors for providing an aesthetic appearance;

a closure panel having an outer cover of cast vinyl material with styling grains and colors corresponding to the outer covering of said interior trim component; said closure panel having a shape corresponding to the opening in said interior trim component and being fit into said opening for closing the opening and for preventing access to said inflatable air bag assembly;

said closure panel having a first substrate with a foam layer molded between it and said outer cover and means forming a construction hole in said first substrate exposing the foam layer to the exterior of said closure panel;

a second substrate having a first segment thereon located in juxtaposed relationship with said first substrate for covering said construction hole and means for securing said second substrate to said first substrate;

means defining a support;

said second substrate having a first end connected to said support for defining a hinged connection between said closure panel and said interior trim component when said closure panel is fit into said opening; said second substrate having a second end; fastening means for connecting said second end to said support for holding said closure panel in place within said opening; and means forming a notch in said second end between said fastening means and said substrate; said notch operable to separate said closure panel from said interior trim component when said air bag is inflated for causing said closure panel to pivot upwardly about said hinged connection to partially cover a windshield while providing for unobstructed deployment of an air bag through said opening into the passenger compartment of a vehicle between the windshield and an occupant on the passenger side of the vehicle.

4. A door assembly for closing an opening in an interior trim component of a vehicle in which an inflatable air bag assembly is housed for deployment of an inflated air bag into a passenger compartment upon vehicle impact comprising:

said interior trim component having an outer covering of vinyl material around the opening having an aesthetic appearance;

a closure panel having an outer cover of vinyl material with styling corresponding to the outer covering of said interior trim component; said closure panel having a shape corresponding to the opening in said interior trim component and being fit into said opening for closing the opening and for preventing access to said inflatable air bag assembly;

said closure panel having a first substrate with a foam layer molded thereto for backing said outer cover; means forming construction holes in said first substrate exposing the foam layer to the exterior of said closure panel;

a second substrate having a first segment thereon located in juxtaposed relationship with said first substrate for covering said construction hole and means for securing said second substrate to said first substrate;

said interior trim component having a reinforcing insert for connecting said interior trim component to a vehicle frame component;

said second substrate having a first end connected to said reinforcing insert for defining a hinged connection between said closure panel and said interior trim component when said closure panel is fit into said opening; said second substrate having a second end connected to said reinforcing insert for holding said closure panel in place within said opening; and means forming a notch in said second end between said fastening means and said reinforcing insert operable to separate said closure panel from said interior trim component at said front edge of said opening when said air bag is inflated for causing said closure panel to pivot upwardly about said hinged connection to partially cover a windshield while providing for unobstructed deployment of an air bag through said opening into the passenger compartment of a vehicle between the windshield and an occupant on the passenger side of the vehicle.

* * * * *